US009305530B1

(12) United States Patent
Durham et al.

(10) Patent No.: US 9,305,530 B1
(45) Date of Patent: Apr. 5, 2016

(54) TEXT SYNCHRONIZATION WITH AUDIO

(71) Applicant: Amazon Technologies, Inc., Seattle, WA (US)

(72) Inventors: Brandon Scott Durham, Seattle, WA (US); Darren Levi Malek, Seattle, WA (US); Toby Ray Latin-Stoermer, Seattle, WA (US); Abhishek Mishra, Seattle, WA (US); Jason Christopher Hall, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/503,073

(22) Filed: Sep. 30, 2014

(51) Int. Cl.
*G10H 1/00* (2006.01)
*G10H 1/36* (2006.01)
*G06F 15/18* (2006.01)

(52) U.S. Cl.
CPC .............. *G10H 1/0008* (2013.01); *G06F 15/18* (2013.01); *G10H 1/361* (2013.01); *G10H 2210/056* (2013.01); *G10H 2220/011* (2013.01)

(58) Field of Classification Search
CPC ............ G06F 15/18; G10H 2220/011; G10H 2210/056; G10H 2210/061; G10H 2240/325; G10H 1/0008; G10H 1/361; G10H 15/18
See application file for complete search history.

(56) References Cited

U.S. PATENT DOCUMENTS

| | | | | |
|---|---|---|---|---|
| 7,977,560 | B2 * | 7/2011 | Marcus | 84/609 |
| 8,005,666 | B2 * | 8/2011 | Goto et al. | 704/207 |
| 2002/0163533 | A1 * | 11/2002 | Trovato et al. | 345/728 |
| 2013/0006627 | A1 * | 1/2013 | Guthery et al. | 704/235 |
| 2014/0149861 | A1 * | 5/2014 | Shih et al. | 715/716 |

* cited by examiner

*Primary Examiner* — Jeffrey Donels
(74) *Attorney, Agent, or Firm* — Thorpe North & Western LLP

(57) ABSTRACT

A technology for synchronizing text with audio includes analyzing the audio to identify voice segments in the audio where a human voice is present and to identify non-voice segments in proximity to the voice segments. Segmented text associated with the audio, having text segments, may be identified and synchronized to the voice segments.

18 Claims, 7 Drawing Sheets

TEXT SYNCHRONIZATION WITH AUDIO

BACKGROUND

A large and growing population of people enjoys entertainment or digital media through consumption of digital content items, such as music, movies, books, games and other types of digital content. Electronic distribution of information has gained in importance with the proliferation of personal computers, mobile devices and mobile phones, and electronic distribution has undergone a tremendous upsurge in popularity as the Internet has become widely available. With the widespread use of the Internet, it has become possible to quickly and inexpensively distribute large units of information using electronic technologies.

The rapid growth in the amount of digital media available provides enormous potential for users to find content of interest. Consumers often enjoy listening to music. In recent years, much of the music listened to by consumers has been digitized and is either streamed or downloaded to a media playback device. The media playback device may be portable, such as a smartphone, tablet, MP3 player or the like, but could be any of a variety of other devices, such as personal computers, stereo systems, televisions and so forth.

While listening to music, some consumers may wish to sing along with the music or to see the lyrics associated with the music. Many of the devices used for playback of music include a display that may be used for navigation and selection of music tracks and so forth. In some cases, lyrics associated with the music are provided on the display of the device. For karaoke type songs, the lyrics are synchronized with the music to display the lyrics for a particular portion of the song when that portion of the song is being played back by the device. During playback, lyrics may be synchronously displayed on the device, such that consumers may see the lyrics and follow along or may sing along with the lyrics as desired. However, the process of synchronizing lyrics to music for these songs is time intensive and involves significant manual effort to identify which lyric(s) should appear during playback of a particular part of the song. As a result, lyrics are often simply made available to consumers without synchronization with music.

DETAILED DESCRIPTION

A technology for synchronizing text with audio includes analyzing the audio to identify voice segments in the audio where a human voice is present and to identify non-voice segments in proximity to the voice segments. Segmented text, which is associated with the audio and has text segments, may be identified and synchronized to the voice segments. The text segments may be segmented by line breaks, commas, spaces, or other notations. The text segment may be, for example, a sentence, a phrase, a set of words, or a single word. The audio may be music with vocals, or may be other types of audio with associable text, such as a speech, a video soundtrack, an audio book, and so forth.

In accordance with another example, a method for synchronizing lyrics with music includes identifying a marker for a singing segment in the music when a person is singing and identifying a marker for a break segment in proximity to the singing segment. The break segment may represent a break in the singing, or a segment of the music where the person is not singing. In addition, the break segment may include other audio elements, such as instrumental music, for example. The method may include identifying lyric segments in lyrics associated with the music. The lyric segments may be divided by lyric breaks. A lyric break may be synchronized with a marker of one of the break segments, and a lyric segment may be synchronized with a marker of one of the singing segments.

Figure 1:
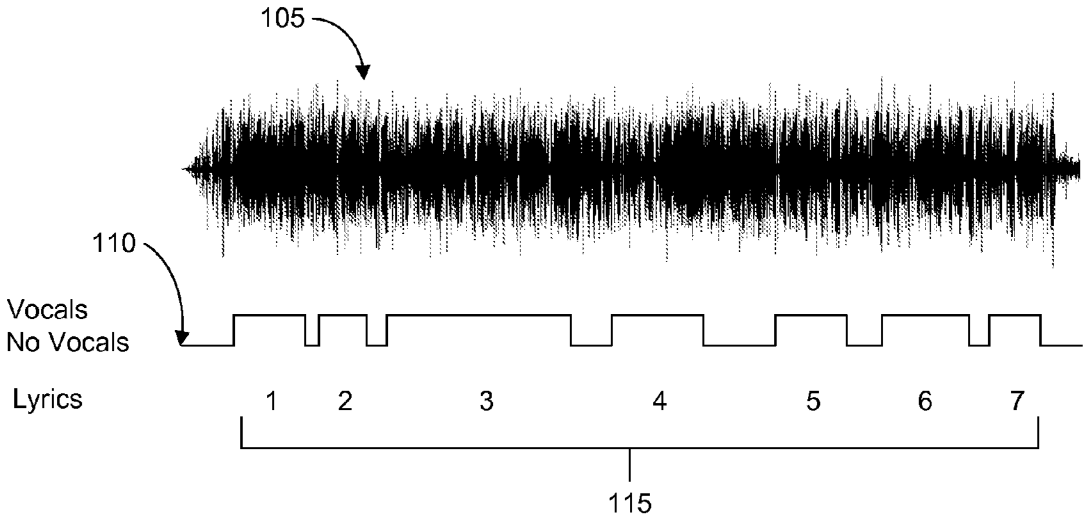
FIG. 1 illustrates an audio segment as aligned with detected vocal and non-vocal segments in the audio segment and lyric segments synchronized to the vocal segments in accordance with an example of the present technology.

FIG. 1 illustrates an example audio segment 105. The audio segment 105 may represent music, for example. As may be appreciated, identification of which portion of the audio segment 105 includes a voice, such as a singing voice, and which portion is simply instrumental or other sounds is not readily identifiable simply from having the illustrated audio segment. Text segments 115, such as lyrics, may be associated with the audio segment 105. Many songs, speeches, audio books, movies, etc. have lyrics, transcripts, text books, scripts, etc. including the words, phrases and the like found in the songs, speeches, audio books and movies. The text segments 115 are not necessarily included with the songs, etc., but may be separately available when not included with the songs. For example, a service provider providing music as a service to customers, may maintain a music data store for storing the music, and a lyrics data store for storing the lyrics. Access to the music and the lyrics may optionally be separate services available to consumers. Even when the service provider does not maintain a lyrics data store, lyrics are often publicly available from other sources, such as various websites on the Internet.

The present technology enables automation in the lyric timecoding process, using machine-learning algorithms to align lyric text to specific points in the digital music. Automation may improve the coverage and quality of lyric timecoding, which in turn may improve a consumer experience with the music.

Songs or other audio may be analyzed to determine for predetermined intervals whether a person is singing during that interval. For example, the audio segment 105 may be analyzed to determine for every second of the audio whether a person is singing, or may determine for every millisecond whether a person is singing. Other time intervals may be used, including longer time intervals such as two seconds, five seconds, etc., or including shorter intervals, such as 500 milliseconds, 100 milliseconds, 50 milliseconds, 1 microsecond, etc. The intervals selected may affect the granularity with which a determination may be made as to whether a person is singing and may thus affect how the synchronization of lyrics with the audio is performed. For example, using a shorter interval, such as a millisecond, the analysis may be able to identify breaks between individual words in a song, whereas intervals of one second, for example, may not as easily distinguish between separate words, but may be better suited for distinguishing breaks between phrases or breaks between different sections of the song. As will be described in further detail later, features may be extracted from the songs, with machine learning used to identify which sets of features represent a presence of a voice or absence of a voice in order to identify the singing or vocal segments and the breaks or non-vocal segments.

After having analyzed the song, markers, such as: time stamps, duration since the previous marker, offsets or other markers may be noted to identify where singing stops and starts in the audio segment 105. The segments of the audio where someone is not singing do not have lyrics synchronized to the segments. However, lyrics will be synchronized to the segments of the audio where a person is singing. FIG. 1 illustrates a square waveform 110, as an example, that identifies when someone is singing and when someone is not singing. In practice, and by way of example, each second of the song may be identified, for example, using 1s and 0s, where a 1 indicates singing and a 0 indicates not singing. Any other suitable convention may be used for identifying whether singing is present for each analyzed time interval. As another example, each line of a song may be identified as having singing and breaks separating the singing may be identified.

Music may include any of a wide variety of different sounds. While a human may be able to easily detect whether singing is present in the audio in most instances, machine learning may be used to enable a computer to learn to identify singing in the music and to differentiate the human voice from among other sounds, such as the sounds of instruments or other sounds. As mentioned previously, a set of songs may be manually classified as training data for training a machine learning model. The manual classification may involve a human indicating when singing stops and starts. The manual classification may, in some examples, be performed in the same time intervals that are used to analyze songs using the machine learning model or may be an alignment of the text associated with the singing with a certain point or time in the audio track. In other words, the intervals used to examine the songs using machine learning models to identify vocal segments may have a same duration as intervals at which the training data was classified, such as in one second intervals, 15 second intervals or another time interval.

Any of a variety of available audio analysis tools may be used to analyze audio for specific characteristics or features of the audio. Some example audio feature extraction tools include Librosa or Marsyas (Music Analysis, Retrieval and Synthesis for Audio Signals). Librosa is a Python module for audio and music processing. Librosa, for example, may provide low-level feature extraction, such as for chromagrams, pseudo-constant-Q (log-frequency) transforms, Mel spectrogram, MFCC (Mel-frequency cepstral coefficients), and tuning estimation. Marsyas is another example technology that is open source and which is designed to extract timbre features from audio tracks. Marsyas is a software framework for rapid audio analysis and synthesis with specific emphasis to music signals and music information retrieval. The technology provides real time audio analysis and synthesis tools. There are a significant number of programming languages, frameworks and environments for the analysis and synthesis of audio signals. The processing of audio signals involves extensive numerical calculations over large amounts of data especially when fast performance is desired.

The timbre of the audio extracted from the audio segment 105 may represent sound qualities of the audio tracks that may not necessarily be classifiable into categories typically considered for music or audio. The features may be classified into a range of values. For example, Marsyas may take the waveform of the audio track and break the waveform down into 124 dimensions or features. Librosa may extract 20 features for each second or other interval of the song. Some features, taken together, indicate the timbre of the song. Because a human voice has an effect on timbre, that effect is something that is measurable. The dimensions or features of the audio may not necessarily be tied to a particular language analog. Consideration of the features in combination may assist in identifying an analog, such as a particular combination of these features may indicate a sound of a human voice in the audio track.

Machine learning may be used to create a correlation between the extracted features and the manually identified audio segments including a human voice. Machine learning may be used to create a model based on this correlation to identify voices in other audio segments when extracted features have similar characteristics to at least some of the extracted features for the manually identified audio segments. To improve the accuracy of the identification of a human voice, a same or similar voice analysis may be used for subsequent audio analyses. In other words, and by way of example, if music by a particular singer has been classified, either manually or by machine, subsequent music by the same singer may be compared against the classification of the earlier music. A voice of the same singer is likely to have a similar effect on timbre of the music across multiple songs. If songs by that singer are not available, songs by a singer with a similar voice, songs by a singer of a similar age, songs of a similar genre or other type or classification of music that have been previously classified may be used to identify when a human voice is present in the music being analyzed. One or more audio tracks may be used as a basis for training the machine learning model. In some examples, a different machine learning model may be created for each artist. In other examples, a different machine learning model may be created for male artists than may be created for female artists. A different machine learning model may be created for female pop artists than may be created for female country artists, and so forth. The specificity of the machine learning modeling may depend on the sample size from which the machine learning draws the samples to create the machine learning model.

As one example machine learning implementation, support vector machines (SVMs) may be used. SVMs are supervised learning models with associated learning algorithms that analyze data and recognize patterns, used for classification and regression analysis. Given a set of training examples, each marked as belonging to one of two categories, an SVM training algorithm builds a model that assigns new examples into one category or the other, making it a non-probabilistic binary linear classifier. An SVM model is a representation of the examples as points in space, mapped so that the examples of the separate categories are divided by a gap. New examples are then mapped into that same space and predicted to belong to a category based on which side of the gap they fall on.

Using the audio analysis tools and machine learning, the present technology may thus analyze audio to identify when a human voice is present in the audio, such as when a human is singing. For instance, the audio may be an MP3 file of a song without time coded lyrics. After extracting the features and processing the features through the SVM classifier for each interval, the technology may be used to determine whether a person is singing or not. Once each second or other interval of the audio is classified, the lyrics may be considered for synchronization with the voice segments in the audio.

A heuristic may be used to assign lyrics to a time point or portion of the audio based on whether the person is singing or not singing. For example, with continued reference to FIG. 1, seven segments of the audio are identified with a human voice. The lyrics include seven segments 115, numbered 1-7. An assumption may be made that each voice segment corresponds to a different lyric segment (e.g., word, phrase, sentence, etc.) on a one to one basis. The lyrics may thus be time-coded for display with the audio when the respective portion of the audio is reached during playback.

In one example, rather than simply applying a heuristic to the output from the audio analysis to assign the lyrics, the assignment of the lyrics, or the heuristic used to assign the lyrics to the audio, may be learned from the input or training data. Thus, machine learning may be used to learn how lyrics should be assigned to voice segments based on the manual classification of the training data.

The text or lyric segments 115 may be segmented in any of a variety of ways. For example, the text segments may be segmented by line breaks, commas, spaces, or other notations or conventions. The text segment may be, for example, a sentence, a phrase, a set of words, or a single word. Line breaks are one convention for distinguishing between different lyric segments associated with musical phrases in the audio and lyrics are commonly available with line breaks between phrases. Also, empty lines between phrases in lyrics often notates a transition from a verse to a chorus or from one verse to another.

The granularity of synchronization may depend on the granularity of detection of breaks in the audio. For example, if the technology analyzes the audio millisecond by millisecond and is able to effectively distinguish between individual words, then individual words from the lyrics may be synchronized with the appropriate audio segments corresponding to the words. However, if the technology is able to effectively distinguish between phrases, but not as effectively between words, the synchronization may be of a lyric phrase to a segment in the audio corresponding to the phrase. Specifically, a phrase of the music may be displayed as lyrics to a consumer across the duration of time that the consumer is listening to the corresponding segment of audio. The accuracy to which the analysis may distinguish between words, phrases or the like may be dependent upon the time intervals analyzed as mentioned, but may also depend at least in part on the specificity of the training data for learning the machine learning model. Use of training data with word by word data may better enable distinguishing between individual words in audio. Use of training data with phrase by phrase data may be better suited for distinguishing between phrases than for distinguishing between words.

The service provider may provide the music or other audio to the consumer via streaming, digital download, or other methods. For example, the service provider may also provide the music to the consumer on a storage medium, such as a compact disc (CD), a digital video disc (DVD), a cassette tape or any other type of storage medium. The service provider may provide lyrics to accompany the music for display on the music playback devices. The lyrics supplied may include synchronous line-by-line display of lyrics as a song progresses. In the past, the timecoding of lyrics was performed manually by a staff of people. These people performed the timecoding and quality control of the final results. The cost and time of this process may limit how broadly lyrics may be delivered across the millions or tens of millions of songs in music catalogs, and may further limit how broadly text associated with audio other than music may be delivered across the audio catalogs.

Figure 2:
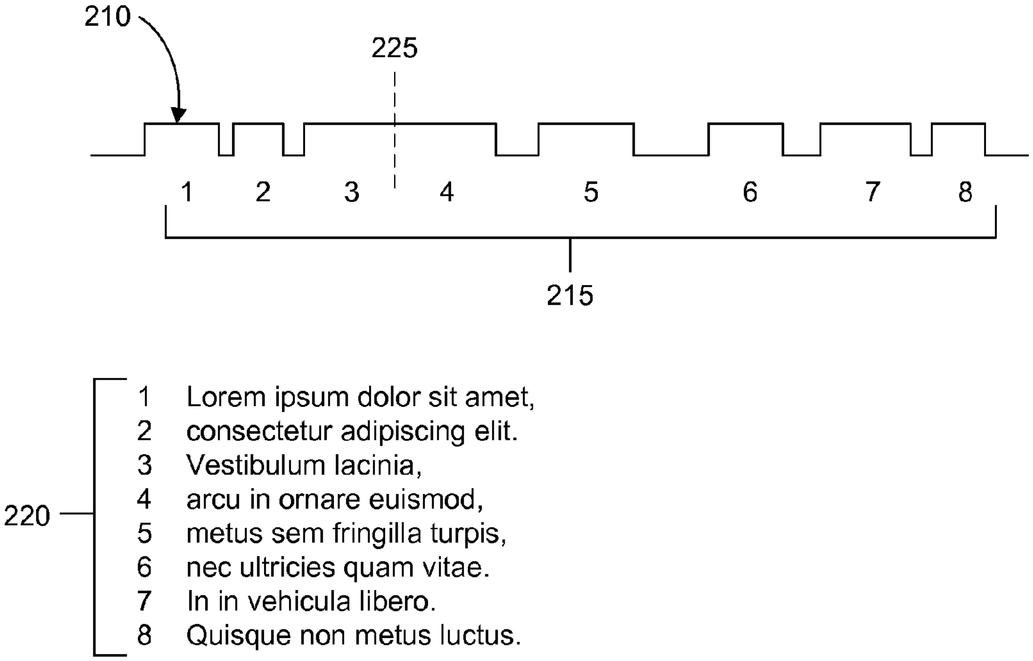
FIG. 2 illustrates detected vocal and non-vocal segments in an audio segment and segmented lyrics synchronized to the vocal segments in accordance with an example of the present technology.

Reference will now be made to FIG. 2. FIG. 2 illustrates a pattern 210 or signal (e.g., a square wave signal) indicating over time whether a voice is present or not in the audio, with peaks representing a presence of the voice and valleys representing absence of the voice. An ideal output from the classifier may indicate one or more zeroes (e.g., ‘0000000’) indicating no singing when a human voice is not present in the audio and may indicate ones (e.g., ‘111111’) when a human voice is present in the audio. As described previously, ideally a specific segment of the lyrics would be assigned per set of ones. However, the result may not be so simple in some cases. As an illustrative example (that may not represent an actual result), a song may be identified as having two singing or voice segments that may be substantially equally sized. However, the associated lyrics may include 40 lyric lines or phrases. The assignment of one lyric phrase for each voice segment will not properly synchronize the lyrics to the audio. In this example, half of the lyrics, or twenty of the phrases, may be assigned to the first voice segment and the other half of the lyrics, or the latter twenty of the phrases, may be assigned to the second voice segment. Because it is not clear when each of these phrases start and stop in the audio, the time duration of the voice segments may be divided by the number of lyric phrases in order to evenly distribute and synchronize the lyric phrases across the voice segment. If each voice segment is two minutes in length (120 seconds), then each lyric phrase may be synchronized to six seconds of the voice segment (120 seconds/20 segments=6 seconds/segment). A first phrase would be assigned to the first six seconds, a second phrase to the next six seconds, and so forth.

The distribution of the lyrics across the identified voice segments may not always be as simple of a matter. For example, some lyric segments may be longer than others and so a more granular approach than the most recent example may be the most effective.

FIG. 2 illustrates another example issue. In FIG. 2, seven voice segments were identified, but there are eight lyric segments 215 of lyrics 220, numbered 1-8, to be associated with the seven voice segments included in pattern 210. One of the identified voice segments (divided by line 225) is significantly longer than any of the others, although the lyric segments are not significantly different from one another in length. Therefore, an assumption may be made that the long voice segment is actually two voice segments and two of the lyric segments may be evenly synchronized across the long voice segment, such as by dividing the long voice segment in half at 225 and associating a first lyric segment (segment 3) with the first half and a second lyric segment (segment 4) with the second half.

Various rules may be implemented to attempt to fit the lyric segments 215 to the audio segments. For example, an assumption may be made that long lyric segments are likely to be associated with long audio segments, at least for a particularly genre or style of music. Another rule may define how to determine when to synchronize multiple lyric segments to a single audio segment, as in the examples above. Another rule may define a minimum number of ones or zeroes for identifying singing or a break in singing (i.e., not singing). A rule may specify that when an audio segment has a fixed length and multiple text segments associated therewith, that the fixed length is equally divided by the number of text segments, for example. A rule may define that for identified chorus sections of a song, that the distribution and synchronization of text for the chorus be performed the same for each repetition of the chorus.

The present technology may be further improved using group-sourced corrections. For example, a consumer may flag a song when the lyrics are not properly synchronized. The song may be processed again to determine whether a different result is reached. If a different result is reached, such as if the machine learning model has been improved or if the analysis used to re-analyze the song is different, then the song with synchronized lyrics may again be presented to the consumer. Alternatively, rather than re-processing the song, the lyrics may be partially manually synchronized with the song. In either scenario, the re-synchronized lyrics may be used as an input to the machine learning model to improve subsequent analysis. In some examples, the consumer may be enabled, through a graphical user interface, to at least roughly indicate or mark when a lyric phrase should begin. This indication may also be used to improve the machine learning model as well as to improve the synchronization of the lyrics with that particular song.

As mentioned previously, the present technology may be applied to audio other than music with singing. For example, the technology may be used to associate text with audio for videos, audio books, speeches and so forth. For audio in audio books, the analysis may be simpler than for music since the extraction of features to identify whether a sound is a human voice may be unnecessary. Specifically, audio books typically do not include many sounds other than a human voice. Therefore, each interval of the audio may be analyzed to determine whether there is sound (e.g., talking) or not. With music, part of the challenge is extracting a voice from the sounds and instruments playing behind the voice.

Figure 3:
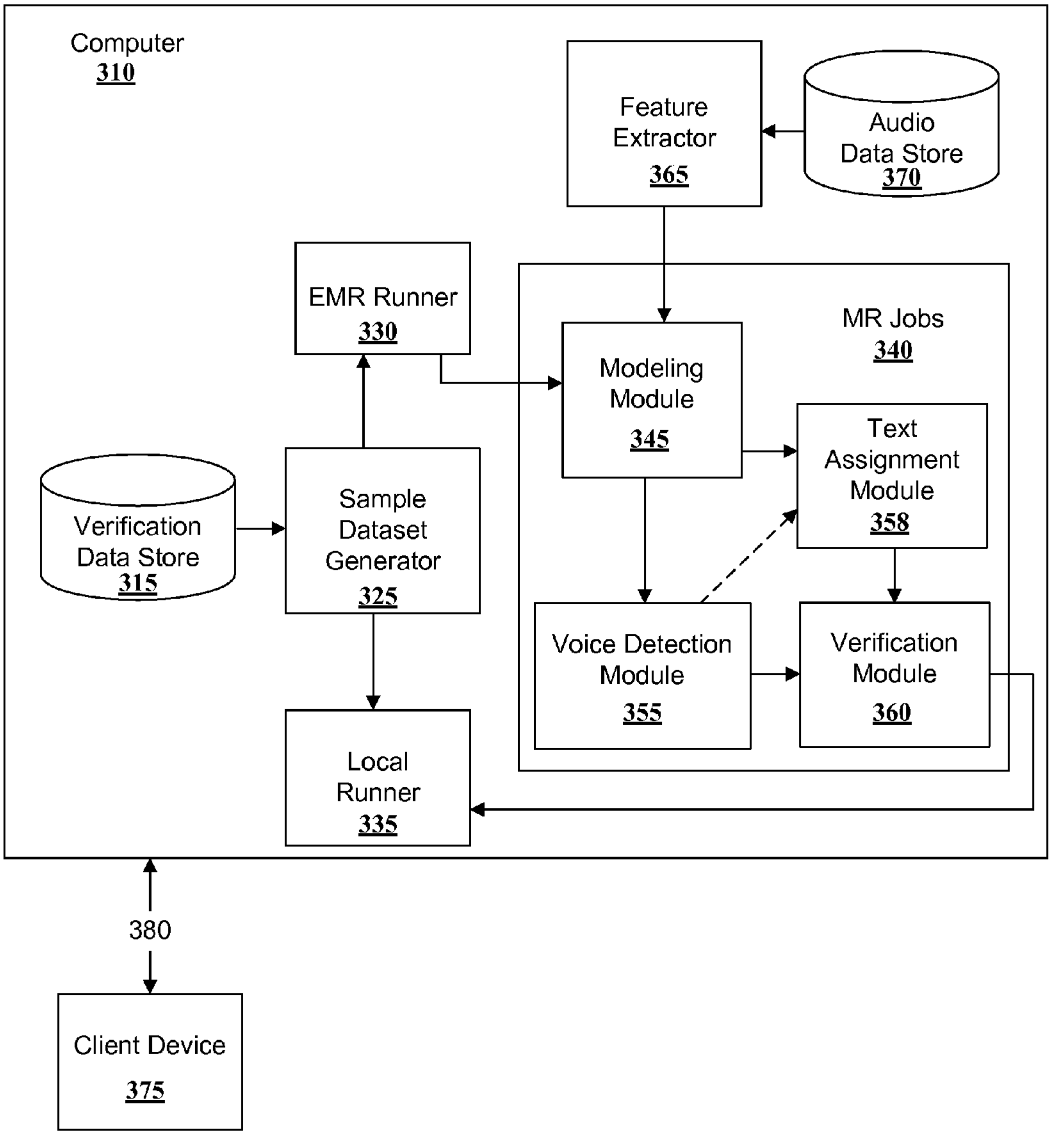
FIG. 3 is a block diagram of a machine learning system for learning to identify voices or to synchronize text with audio based on a sample dataset in accordance with an example of the present technology.

Reference will now be made to FIG. 3. FIG. 3 illustrates an overview of a system for synchronizing text with audio in accordance with an example of the present technology. The system may be operated in a single or multi-tenant environment. The system may be operated on one or more computing devices 310, such as a single server environment or a clustered server environment.

The system may include a verification data store 315. The verification data store 315 may include a database of manually classified data results (e.g., classified nodes or vertices) used as training data for identifying a human voice in music and/or for synchronizing text with audio. Because the data in the verification data store 315 may have been manually classified by an operator, the data may be used as a basis for learning or recognizing a vocal "fingerprint" in audio or for learning or recognizing how to synchronize text with the audio as has been described previously. As will be described in additional detail later, the verification data store 315 may include features of the audio, and the features may be associated with the voice(s). Identification of features of audio to be synchronized, followed by a comparison of the features of the training dataset to the features of the audio to be synchronized or by analyzing the features of the audio to be synchronized using the machine learning model may enable accurate classification of whether a voice is present in the audio from the training dataset and accurate synchronization of text to the audio.

A sample dataset generator 325 may take the training dataset from the verification data store 315 and split the data into a training set and a test set. For example, the training dataset may be split into ten portions with eight portions used for the training set and two portions used for verification of the test set. The training set may be sent to an EMR runner 330. Technology other than an EMR (Elastic MapReduce) runner 330 may be used, but this example uses an EMR runner 330 for illustration purposes. An Elastic MapReduce (EMR) cluster and application may enable analysis and processing of large amounts of data. The EMR may distribute the computational work across a cluster of virtual servers running in a multi-tenant service provider environment, for example. The cluster may be managed using an open-source framework called Hadoop.

Hadoop uses a distributed processing architecture called MapReduce (MR) in which a task is mapped to a set of servers for processing. The results of the computation performed by those servers is then reduced down to a single output set. One node, designated as the master node, controls the distribution of tasks. The EMR runner 330 in FIG. 3 represents the master node controlling distribution of MR (map reduce) tasks or jobs. The jobs may be run in parallel across multiple different nodes (e.g., servers).

The test set data from the sample dataset generator 325 is compared at the local runner 335 or node (such as using N fold stratified cross-validation). A machine learning model that is built by the MR Jobs 340 module is compared to the test set to evaluate the accuracy of the machine learning model. This comparison may be performed using the output of MR Jobs 340. MR Jobs 340 may take the training data and find features in the target audio using the feature extractor 365. The MR Jobs 340 module may also take features of unclassified audio from a feature extractor 365, which extracts features of audio in the audio data store 370 and the MR Jobs 340 module may process the unclassified data. A modeling module 345 may be used to determine which model to use for voice detection by the voice detection module 355 or text assignment by the text assignment module 358. The modeling module 345 may be further configured to generate models for use by the voice detection module 355 or text assignment module 358.

With continued reference to FIG. 3, voice detection may be performed using a voice detection module 355. The results of the voice detection, and a machine learning model resulting from the voice analysis or detection, may be fed back to the local runner 335 to compare against the test set. This may be iterated a number of times. A machine learning model may be created for each iteration. A final machine learning model may be a best machine learning model from the iterations or may be a cumulative or combined machine learning model from the iterations. The text assignment module 358 may be used to perform synchronization of text segments with voice segments, as described elsewhere in this application. The process may be iteratively performed to create a model from the training data or to improve the model. Voice detection and text assignment may be performed in separate processes or iterations of a same process, or may be performed in a sequence, as illustrated by the dotted line between the voice detection module 355 and the text assignment module 358.

A features data store (e.g., within audio data store 370) may store, for each of the tracks to be classified, the set of features extracted for those tracks. These tracks or features of tracks may be used in MR Jobs 340. The EMR runner 330 may build the machine learning model using MR Jobs 340 and the local runner 335 validates the machine learning model that is created using the verification module 360.

Audio in which vocal and non-vocal segments have been detected may be synchronized with text. For example, the vocal segments may be synchronized with text segments on a 1:1 basis, where one text segment is synchronized with one vocal segment. As another example, text and vocal segments may be synchronized according to synchronization rules for associating text with audio based on aspects such as text segment length, audio segment length, division of audio or text segments, and so forth as is described elsewhere in this document. Also as is described elsewhere, machine learning models may also be used for synchronizing text with audio. Manually synchronized text and audio may be used as an input for building the machine learning model. Features of unsynchronized text and audio may be an input to a machine learning model to result in a layout or scheme for synchronized text-audio output. A system for synchronizing the text and audio may be similar to the system illustrated in FIG. 3 for voice detection.

The present technology may utilize manual synchronization of text with audio as training data for training a machine learning model. The machine learning model may be used to perform automated analysis of audio and synchronization of text with the audio. Any of a variety of machine learning techniques may be used to create the machine learning model. The machine learning model may be improved over time through the processing of the audio and from any feedback received on performance of the machine learning model. For example, if a consumer reports a song as having lyrics which are not properly synchronized, then the error(s) and the correction(s) may be used as inputs into the machine learned model to improve performance for future processing of songs. In this example, the error report may be the input, with a correction to the synchronization as the output, with the machine learning model being improved based on the input to more accurately analyze the song.

The system may include one or more data stores configured to store any of a variety of useful types and formats of data. For example, a data store may include a digital audio data store (i.e., audio data store 370). The digital audio data store may include, for example, the digital audio in a catalog, including synchronized digital audio and synchronized digital audio (i.e., the audio with synchronized lyrics and the audio waiting for lyric synchronization). The digital audio data store may also store text, images, audio, video and so forth that may be associated with the audio tracks.

As used herein, the term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

A client device 375 may access the digital audio or any other desired data via the computing device over a network 380. Example client devices 375 may include, but are not limited to, a desktop computer, a laptop, a tablet, a mobile device, a television, a set-top box, a cell phone, a smart phone, a hand held messaging device, a personal data assistant, an electronic book reader, heads up display (HUD) glasses, an in-vehicle computer system, or any device with a display that may receive and present the digital media. The network 380 may be representative of any one or combination of multiple different types of networks, such as the Internet, cable networks, cellular networks, wireless networks (e.g., Wi-Fi, cellular, etc.), wired networks and the like.

The system may be implemented across one or more computing device(s) 310 connected via a network 380. For example, a computing device may include a data store and various engines and/or modules such as those described above and such modules may be executable by a processor of the computing device. The system may be implemented as a plurality of computing nodes, each of which comprises at least one processor and a memory, where the computing nodes are configured to collectively implement the modules, data stores and so forth.

Figure 4:
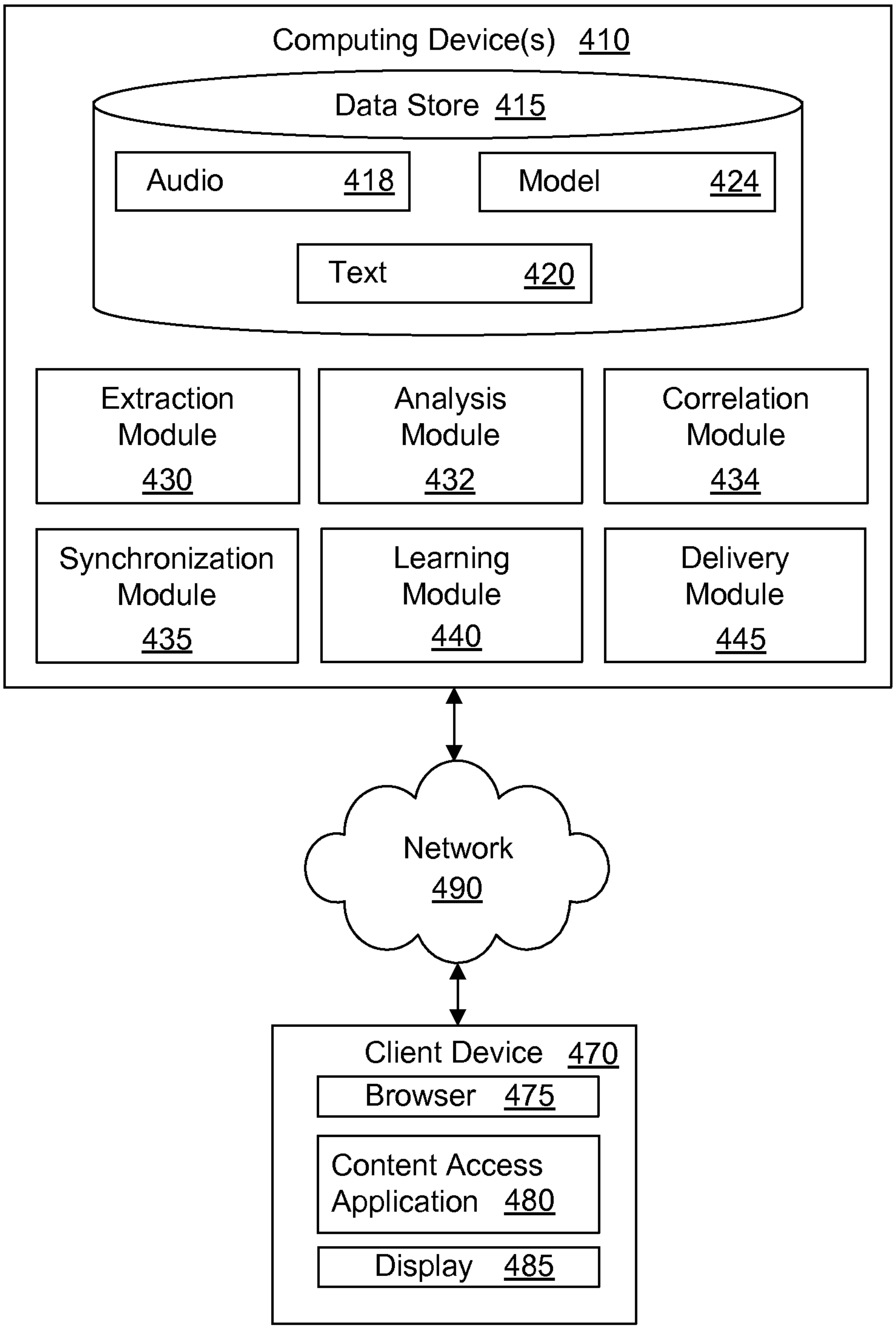
FIG. 4 is a block diagram of a computing system for synchronizing text with audio in accordance with an example of the present technology.

Reference will now be made to FIG. 4. FIG. 4 illustrates a system configured to synchronize lyrics with music in accordance with an example of the present technology.

In one example, the system may include one or more server computers or other computing devices 410. Software on the computing device 410 may be an application or a computer program, such as may be designed to perform an activity, such as analyzing data, comparing data, learning models from data and so forth. Applications executable on the computing device 410 and in the service provider environment may be any suitable type or form or application as may be appreciated.

The system may include one or more data stores 415. The data store 415 may include or be configured to store any of a variety of useful types and formats of data. For example, the data store 415 may include an audio data store 418 for storing audio. The audio data store 418 may store synchronized audio tracks as well as audio tracks yet to be synchronized with text. The data store 415 may include a text data store 420 for storing text to be synchronized with audio. The text may include, for example, lyrics, transcripts, scripts, or any other suitable text for synchronization with audio. The data store 415 may also include a model data store 424 for storing training data for use in creating machine learning models for identifying voices or for synchronizing text with audio in examples where machine learning is used. The model data store 424 may further store the machine learning models created.

The system may include any number of modules useful for enabling the audio-text synchronization technology and for providing the audio with text as a service from the computing device(s) 410. For example, the system may include an extraction module 430 to extract features from the audio using Librosa or another suitable audio feature extraction technology, as has been described. The system may include an analysis module 432. The analysis module 432 may be configured to perform audio analysis and/or text analysis. For example, the analysis module 432 may be configured to analyze audio to identify a voice segment in the audio where a human voice is present based on the extracted features and a machine learning model stored in the model data store 424. The analysis module 432 may also be configured to identify segments in text associated with the audio, such as by identifying line breaks, spacing, punctuation or the like.

The system may include a correlation module 434. The correlation module 434 may be configured to determine a number of the segments of the text to synchronize with the voice segment. The system may include a synchronization module 435 to synchronize text segments to the feature-extracted audio based on results from the analysis module 432 and the correlation module 434. The system may include a learning module 440 to learn the machine learned models used to identify the human voices and to synchronize the lyrics to the audio when machine learning is used as part of the system.

Machine learning may take empirical data as input, such as data from the manually classified audio, and yield patterns or predictions which may be representative of voices in other audio. Machine learning systems may take advantage of data to capture characteristics of interest having an unknown underlying probability distribution. Machine learning may be used to identify possible relations between observed variables. Machine learning may also be used to recognize complex patterns and make machine decisions based on input data. In some examples, machine learning systems may generalize from the available data to produce a useful output, such as when the amount of available data is too large to be used efficiently or practically. As applied to the present technology, machine learning may be used to learn which audio features correspond to the presence of a voice in the audio. Machine learning may further be used to learn how best to synchronize lyrics to the audio.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure. Support vector machines (SVMs) and regression are a couple of specific examples of machine learning that may be used in the present technology.

The system may also include a delivery module 445 configured to deliver audio from the audio data store 418 to consumers at client devices (e.g., client device 470) over a network 490. The delivery module 445 may be configured to deliver the audio and the synchronized text together or may deliver the audio and the synchronized text separately but for display together in synchronization. The deliver module 445 may deliver the audio and synchronized text in a streaming mode or for download.

Client devices 470 may access audio data, lyrics, content pages, services and so forth via the computing device 410 in the service provider environment over a network 490. Example client devices 470 may include a display 485 that may receive and present the lyrics in synchronization with audio played back at the client devices 470.

The system may be implemented across one or more computing device(s) 410 in the service provider environment and including client devices 470 connected via a network 490. For example, a computing device 410 may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device 410. The computing device 410 may comprise, for example, a server computer or any other system providing computing capability. Alternatively, a plurality of computing devices 410 may be employed that are arranged, for example, in one or more server banks, blade servers or other arrangements. For example, a plurality of computing devices 410 together may comprise a clustered computing resource, a grid computing resource, and/or any other distributed computing arrangement. Such computing devices may be located in a single installation or may be distributed among many different geographical locations. For purposes of convenience, the computing device 410 is referred to herein in the singular form. Even though the computing device 410 is referred to in the singular form, however, it is understood that a plurality of computing devices 410 may be employed in the various arrangements described above.

Various applications and/or other functionality may be executed in the computing device 410 according to various implementations, which applications and/or functionality may be represented at least in part by the modules that have been described. Also, various data may be stored in a data store that is accessible to the computing device 410. The data store 415 may be representative of a plurality of data stores as may be appreciated. The data stored in the data store 415, for example, may be associated with the operation of the various modules, applications and/or functional entities described. The components executed on the computing device 410 may include the modules described, as well as various other applications, services, processes, systems, engines or functionality not discussed in detail herein.

The client device 470 shown in FIG. 4 may be representative of a plurality of client devices 470 that may be coupled to the network 490. The client device(s) 470 may communicate with the computing device over any appropriate network, including an intranet, the Internet, a cellular network, a local area network (LAN), a wide area network (WAN), a wireless data network or a similar network or combination of networks.

The client device 470 may include a display 485. The display 485 may comprise, for example, one or more devices such as cathode ray tubes (CRTs), liquid crystal display (LCD) screens, gas plasma based flat panel displays, LCD projectors, or other types of display devices, etc.

The client device 470 may be configured to execute various applications such as a browser 475, a respective page or content access application 480 for an electronic retail store and/or other applications. The browser 475 may be executed in a client device 470, for example, to access and render content pages, such as web pages or other network content served up by the computing device 410 and/or other servers. The content access application 480 may be executed to obtain and render for display content features from the server or computing device, or other services and/or local storage media.

In some implementations, the content access application 480 may correspond to code that is executed in the browser 475 or plug-ins to the browser 475. In other implementations, the content access application 480 may correspond to a standalone application, such as a mobile application. The client device may be configured to execute applications beyond those mentioned above, such as, for example, mobile applications, email applications, instant message applications and/or other applications. Customers at client devices 470 may access content features through content display devices or through content access applications 480 executed in the client devices 470.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

Figure 5:
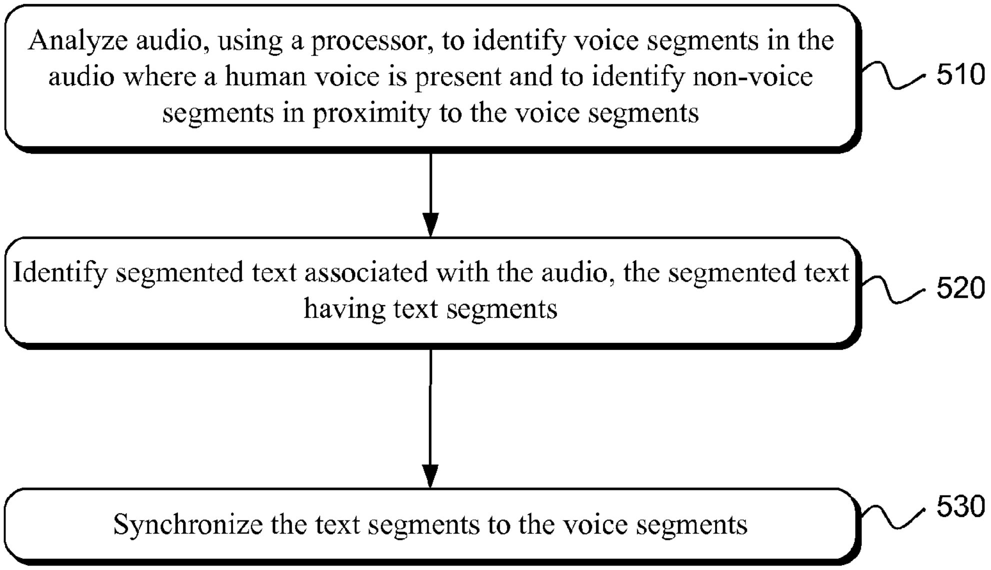
FIGS. 5-6 are flow diagrams of methods for synchronizing text with audio in accordance with examples of the present technology.
Figure 6:
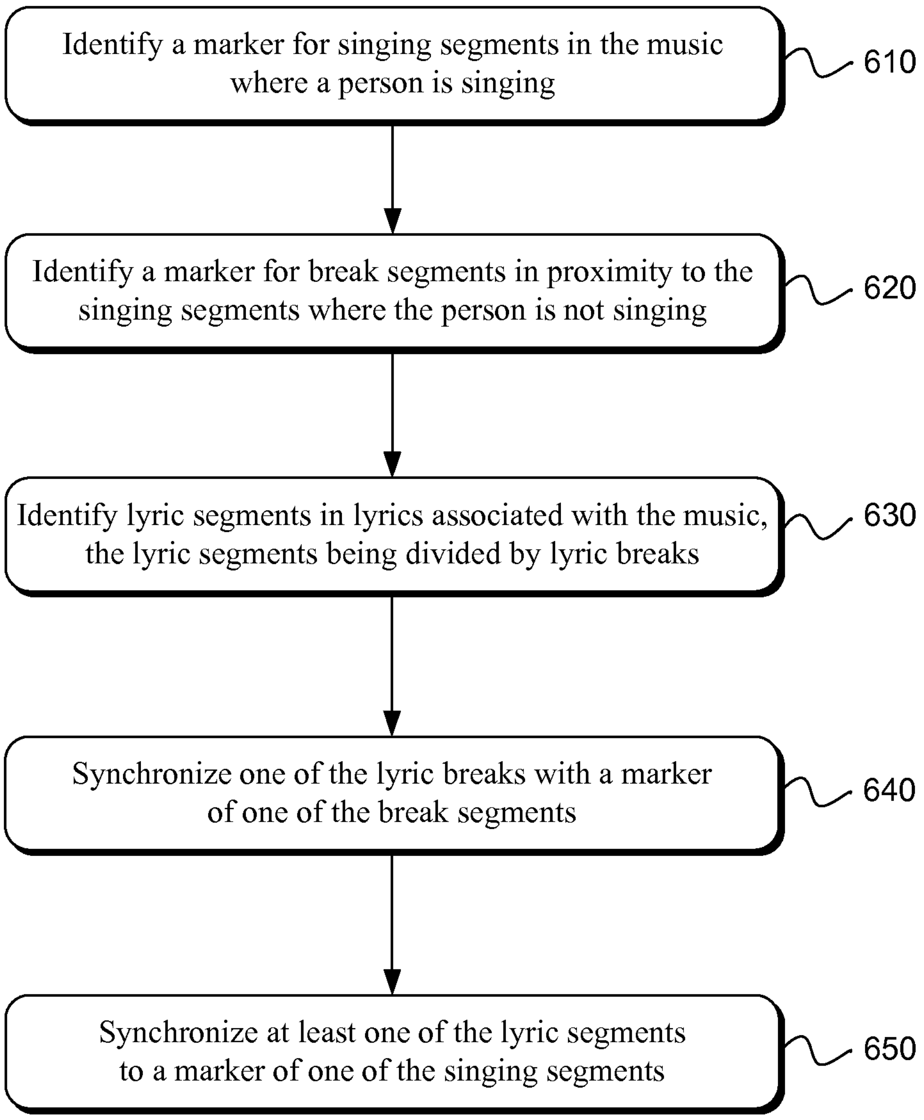

FIGS. 5-6 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 5, a flow diagram of a method for synchronizing text with audio is illustrated in accordance with an example of the present technology. The method may include being implemented on a computing device that is configured to facilitate organization of the streaming data. The computing device may include a processor, a memory in electronic communication with the processor, and instructions stored in the memory. The instructions may be executable by the processor to perform the method of FIG. 5.

The method may include analyzing 510 the audio to identify voice segments in the audio where a human voice is present and to identify non-voice segments in proximity to the voice segments. Segmented text associated with the audio, having text segments may be identified 520 and synchronized 530 to the voice segments. The segmented text may be lyrics for a song, subtitles for a video, text of a book, etc. The audio may be the song, the audio track of the video, the narration of the book, etc. The text segments may be segmented by line breaks, commas, spaces, or other notations. The text segment may be, for example, a sentence, a phrase, a set of words, or a single word.

The method may further include soliciting group-sourced corrections to the synchronizing of the at least one segment of the segmented text to the voice segment. For example, as mentioned previously, an option may be presented to a consumer, via a graphical user interface, to indicate whether the synchronization is correct, or in some examples to at least roughly specify where text and audio may be synchronized to improve the synchronization.

The method may include using machine learning, such as support vector machines, to identify the voice segment. For example, the method may include analyzing other classified audio of a same genre or including a similar voice. As another example, the method may include analyzing other audio by the same human voice. The method may also use machine learning to learn how to synchronize the text with the audio.

The method may include analyzing the audio at predetermined intervals and classifying each interval based on whether the human voice is present. For example, a notation or marker may be made for each interval identifying whether the voice is present or not for that interval. Any suitable notation or mark may suffice. An example provided previously described the use of a "1" to indicate presence of the voice and a "0" to indicate absence of the voice.

The method may include identifying a break between multiple voice segments and associating a break between segments of the segmented text with the break between the multiple voice segments. The multiple voice segments may each include multiple words. The text segments may also each include multiple words. Alternatively, depending on the granularity of synchronization, the multiple voice segments may each include a single word and each segment of the segmented text may include a single word.

Referring now to FIG. 6, a flow diagram of a method for synchronizing lyrics with music is illustrated in accordance with an example of the present technology. The method may include identifying 610 a marker for singing segments in the music where a person is singing. The method may also include identifying 620 a marker for break segments in proximity to the singing segments where the person is not singing. Based on the markers identifying singing segments and break segments, or non-singing segments, a system may readily identify portions of the music to which lyrics should be synchronized (e.g., the singing segments) or portions of the music which should not have lyrics synchronized (e.g., the break segments).

The method may also include identifying 630 lyric segments in text lyrics associated with the music. The lyric segments may be divided by lyric breaks. The lyric breaks may be spaces, line breaks, punctuation, or other conventions which may be interpreted by a computing system as a break. The lyric breaks may be synchronized 640 with a marker of one of the break segments in the music. The lyric segments may be synchronized 650 to a marker of one of the singing segments. In other words, the lyrics and music may be synchronized such that lyrics are associated with singing segments and breaks in the lyrics are associated with breaks in singing.

The method may include extracting features from the music to identify the markers of the singing segments and break segments. The features may be analyzed based on machine learning models to identify the singing segments.

The method may include synchronizing multiple lyric segments with the one of the singing segments. For example, a time duration of the singing segment may be divided by a number of the multiple lyric segments to be synchronized to the singing segment. This division may result in singing sub-segments. Individual portions of the multiple lyric segments may be synchronized with individual portions of the singing sub-segments (see, e.g., FIG. 2, where lyric segments 3-4 are synchronized with a single singing segment).

The method may include synchronizing an individual lyric segment with multiple singing segments. For example, a system may have identified more singing segments than lyric segments. One or more individual lyric segments may each be synchronized with multiple singing segments. Machine learning may be used to determine how to synchronize the lyrics to the singing segments, as has been described previously. In some instances, the voice detection may be sufficiently accurate to identify breaks between words or phrases corresponding to a lyric segment and may thus result in multiple voice segments. The machine learning analysis may consider factors such as duration of the singing segments, duration of the breaks between the singing segments, length of lyric segments, divisibility of the lyric segments into sub-segments to best fit the singing segments, identification of phrases or words in singing segments that are likely to result in identification of breaks between singing segments which otherwise would correspond to one lyric segment, and so forth.

While one or more lyric segments may typically be synchronized to one or more singing segments and one or more singing segments may typically be synchronized to one or more lyric segments, there may be instances where no lyric segments are synchronized to a singing segment or where no singing segments are synchronized to a lyric segment. Thus, although one or more lyric and singing segments may be synchronized for a particular audio track, one or more additional lyric or singing segments may remain unsynchronized. For example, a song may have two equal lyric segments with the following output from the voice detection:

1 1 1 1 1 1 1 1 0 0 0 0 0 0 0 0 1 0 0 0 0 0 0 0 0 1 1 1 1 1 1 1 where the 1's represent singing segments where singing is detected and the 0's represent break segments where no singing is detected. In this case, a first of the lyric segments may be assigned to the first large set of 1's and a second of the lyric segments may be assigned to the second large set of 1's, but no lyrics may be assigned to the lone 1 in the center. The machine learning model for lyric synchronization may recognize spurious voice detections in some instances, such as when a lone 1 is detected surrounded by many 0's on either side. The spurious voice detections may be ignored in order to enable accurate synchronization. It is noted that some artists, genres, etc. may have shorter singing segments, generally different sizes of breaks between singing segments, different length lyric segments, etc. which may be considered in the machine learning model to determine whether for any particular song a particular output should be considered a spurious voice detection or should be synchronized with lyrics.

Similarly as mentioned in the description of the method illustrated in FIG. 5, additional example details, operations, options, variations, etc. that may be part of the method illustrated in FIG. 6 have been described previously herein and/or are described in further detail below. Various systems, devices, components, modules and so forth for implementing the method may also be used, as described with respect to the various examples included in this disclosure.

Figure 7:
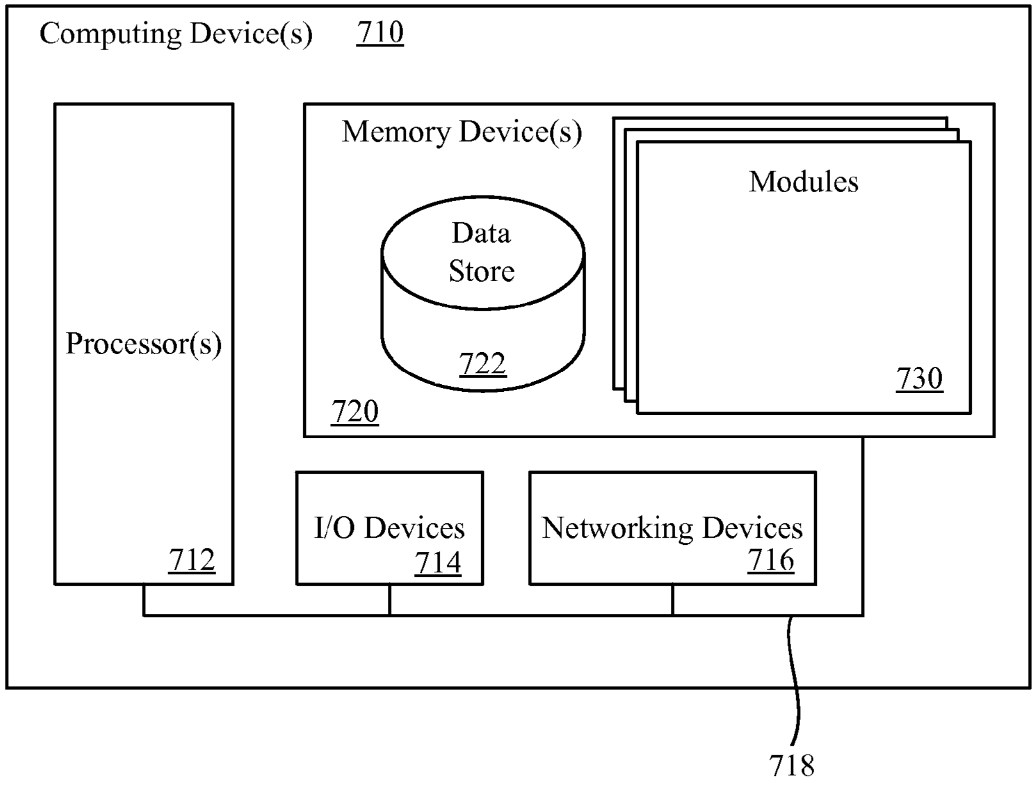
FIG. 7 is a block diagram of a computing system for synchronizing text with audio in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of the video processing, to make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computing device that is configured to synchronize lyrics with music, comprising:
- a processor;
- a memory in electronic communication with the processor;
- instructions stored in the memory, the instructions being executable by the processor to:
  - identify a marker for singing segments in the music where a person is singing using a machine learning model;
  - identify a marker for break segments in proximity to the singing segments where the person is not singing using the machine learning model;
  - identify lyric segments in lyrics associated with the music, the lyric segments being divided by lyric breaks;
  - synchronize one of the lyric breaks with a marker of one of the break segments; and
  - synchronize at least one of the lyric segments to a marker of one of the singing segments.

2. The computing device of claim 1, further configured to extract features from the music to identify the markers of the singing segments and break segments using the machine learning model.

3. The computing device of claim 1, further configured to:
- synchronize multiple lyric segments with one of the singing segments by dividing time duration of the singing segment by a number of the multiple lyric segments to derive singing sub-segments; and
- synchronize individual multiple lyric segments with individual singing sub-segments;
- wherein synchronizing the lyric segments with the singing segments or sub-segments is based on a machine learning synchronization model.

4. The computing device of claim 1, further configured to synchronize an individual lyric segment with multiple singing segments upon identifying the singing segments outnumber the lyric segments.

5. A computer-implemented method, comprising:
- analyzing audio, using a processor, to extract features from the audio and identify voice segments in the audio where a human voice is present and to identify non-voice segments in proximity to the voice segments based on the extracted features;
- identifying segmented text associated with the audio, the segmented text having text segments;
- synchronizing the text segments to the voice segments using the processor; and
- soliciting group-sourced corrections to correct the synchronizing of the text segments to the voice segments.

6. The method of claim 5, further comprising using machine learning to identify the voice segment by analyzing other classified audio of a same genre or including a similar voice.

7. The method of claim 5, further comprising using machine learning to identify the voice segment by analyzing other audio by the human voice.

8. The method of claim 5, further comprising analyzing the audio at predetermined intervals and classifying each interval based on whether the human voice is present.

9. The method of claim 8, wherein the predetermined intervals are less than a second.

10. The method of claim 8, wherein the predetermined intervals are milliseconds.

11. The method of claim 5, wherein the segmented text includes subtitles for a video.

12. The method of claim 5, wherein the segmented text is lyrics for a song.

13. The method of claim 5, wherein the segmented text is text of a book and the audio is an audio narration of the book.

14. The method of claim 5, further comprising identifying a break between multiple voice segments and associating a break between segments of the segmented text with the break between the multiple voice segments.

15. The method of claim 14, wherein the multiple voice segments each include multiple words.

16. The method of claim 14, wherein the multiple voice segments each include a single word and each segment of the segmented text includes a single word.

17. A non-transitory computer-readable medium comprising computer-executable instructions which, when executed by a processor, implement a system, comprising:
- an audio analysis module configured to analyze audio to identify a voice segment in the audio where a human voice is present;
- a text analysis module configured to identify segments in text associated with the audio and identify the voice segment as trained using other audio;
- a correlation module configured to determine a number of the segments of the text to associate with the voice segment; and
- a synchronization module to associate the number of the segments of the text with the voice segment.

18. The computer-readable medium of claim 17, wherein machine learning module uses a support vector machine learning algorithm to learn to identify the voice segment based on the other audio.

* * * * *